United States Patent
Jonsson (10) Patent No.: US 10,814,750 B2
(45) Date of Patent: Oct. 27, 2020

(54) METHOD AND VEHICLE SEAT ARRANGEMENT COMPRISING A DEFORMATION PORTION

(71) Applicant: Ningbo Geely Automobile Research & Development Co., Ltd., Ningbo (CN)

(72) Inventor: Tony Jonsson, Alingsås (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 59 days.

(21) Appl. No.: 15/913,737

(22) Filed: Mar. 6, 2018

(65) Prior Publication Data

US 2018/0194253 A1 Jul. 12, 2018

Related U.S. Application Data

(63) Continuation of application No. PCT/IB2016/055323, filed on Sep. 7, 2016.

(30) Foreign Application Priority Data

Sep. 7, 2015 (SE) ..................................... 15511363

(51) Int. Cl.
*B60N 2/427* (2006.01)
*B60N 2/70* (2006.01)
*B60N 2/42* (2006.01)

(52) U.S. Cl.
CPC ....... *B60N 2/42709* (2013.01); *B60N 2/4242* (2013.01); *B60N 2/7094* (2013.01)

(58) Field of Classification Search
None
See application file for complete search history.

(56) References Cited

U.S. PATENT DOCUMENTS 3,428,150 A    2/1969 Muspratt
3,578,376 A *  5/1971 Hasegawa ................ B60N 2/07
                                                    296/68.1
(Continued)

FOREIGN PATENT DOCUMENTS

CN    2568466 Y    8/2003
CN    1668489 A    9/2005
(Continued)

OTHER PUBLICATIONS

The PCT Search Report and Writen Opinion dated Dec. 15, 2016 for PCT Application No. PCT/IB2016/055323, 12 pages.

*Primary Examiner* — David E Allred
(74) *Attorney, Agent, or Firm* — Lee & Hayes, P.C.

(57) ABSTRACT

A vehicle seat arrangement in a vehicle is disclosed. The vehicle seat arrangement comprises a vehicle seat with a back portion and a seat portion, said seat portion comprises a front section, adapted to support legs and knees of a user, and a rear section adapted to support the user's weight. The rear section of the vehicle seat comprises a deformation unit adapted to reduce the force exerted on the user during a crash, the force being absorbed through plastic deformation of a deformation portion. The deformation portion is adapted to deform with a linear deformation property of the energy absorption, after a force threshold is exceeded. A vehicle comprising such a vehicle seat arrangement, and a method used in said vehicle seat arrangement are also disclosed.

11 Claims, 9 Drawing Sheets

(56) References Cited

U.S. PATENT DOCUMENTS

| | | | |
|---|---|---|---|
| 3,669,397 A | 6/1972 | Le Mire | |
| 4,712,834 A * | 12/1987 | Warrick | A47C 7/14 244/122 R |
| 5,273,240 A * | 12/1993 | Sharon | B60N 2/4242 188/271 |
| 5,454,622 A * | 10/1995 | Demopoulos | B60N 2/4221 188/374 |
| 5,584,525 A * | 12/1996 | Nakano | B60N 2/4235 296/187.12 |
| 5,730,492 A * | 3/1998 | Warrick | B60N 2/4221 297/216.2 |
| 5,788,185 A * | 8/1998 | Hooper | B64D 11/0619 244/118.6 |
| 6,254,181 B1 | 7/2001 | Aufrere et al. | |
| 6,648,409 B1 * | 11/2003 | Laporte | B60N 2/4221 297/216.1 |
| 7,513,575 B1 * | 4/2009 | Go | B60N 2/688 297/486 |
| 8,888,179 B1 * | 11/2014 | Bosen | F16F 7/125 297/216.16 |
| 10,161,469 B1 * | 12/2018 | Bosen | B60N 2/42736 |
| 2001/0011810 A1 * | 8/2001 | Saiguchi | B60N 2/885 280/728.1 |
| 2002/0030392 A1 | 3/2002 | Kitagawa | B60N 2/4249 297/216.13 |
| 2002/0053792 A1 * | 5/2002 | Yamaguchi | B60N 2/42763 280/748 |
| 2002/0079725 A1 * | 6/2002 | George Ruff | F16F 7/12 297/216.13 |
| 2002/0084131 A1 * | 7/2002 | Motozawa | B60N 2/4221 180/274 |
| 2004/0108752 A1 * | 6/2004 | Rajasingham | A61G 5/04 296/68.1 |
| 2004/0183337 A1 * | 9/2004 | Wang | B60N 2/42709 296/187.12 |
| 2005/0040686 A1 * | 2/2005 | Van-Thournout | B60N 2/4228 297/284.4 |
| 2005/0145597 A1 * | 7/2005 | Kull | B60N 2/4242 216/13 |
| 2005/0231011 A1 * | 10/2005 | Fujita | A47C 7/14 297/216.14 |
| 2007/0222270 A1 * | 9/2007 | Combest | B60N 2/4221 297/452.21 |
| 2007/0228784 A1 | 10/2007 | Wells, Jr. | |
| 2010/0237669 A1 | 9/2010 | Kruger et al. | |
| 2010/0270836 A1 * | 10/2010 | Mowry | B60N 2/24 297/216.19 |
| 2011/0031055 A1 * | 2/2011 | Rajasingham | B60N 2/68 180/271 |
| 2012/0126591 A1 | 5/2012 | Ruthinowski et al. | |
| 2013/0334847 A1 * | 12/2013 | Enoki | B60N 2/72 297/216.1 |
| 2015/0210190 A1 * | 7/2015 | Ruckriegel | B60N 2/72 297/216.13 |
| 2016/0243967 A1 * | 8/2016 | Seibold | B60N 2/525 |
| 2016/0375805 A1 * | 12/2016 | Krueger | B60N 2/4249 297/216.1 |
| 2020/0062149 A1 * | 2/2020 | Sekizuka | B60N 2/4221 |

FOREIGN PATENT DOCUMENTS

| | | |
|---|---|---|
| CN | 103974851A A | 8/2014 |
| DE | 102007003160 A1 | 7/2008 |
| DE | 102008025135 | 12/2009 |
| FR | 2044083 | 2/1973 |
| FR | 2755913 | 5/1998 |
| JP | 11048841 A * | 2/1999 |
| WO | WO2012066275 | 5/2012 |

* cited by examiner

METHOD AND VEHICLE SEAT ARRANGEMENT COMPRISING A DEFORMATION PORTION

This application is a continuation of PCT International Application No. PCT/IB2016/055323, filed Sep. 7, 2016, which claims foreign priority to Sweden Application No. 1551136-3, filed on Sep. 7, 2015, both of which are incorporated herein by reference.

TECHNICAL FIELD

The present invention relates generally to a vehicle seat arrangement for enhancing passenger safety.

BACKGROUND ART

In prior art it is known to provide solutions for enhancing the passenger safety during vehicle accidents. The vehicle interior handles most of the contact with the driver and passengers during an accident and serves a crucial role for protecting the individuals within the vehicle's passenger compartment during an accident. Solutions for protecting passengers in a vehicle passenger compartment are available in prior art and comprises airbags, seatbelts, padded surfaces, and many other protective solutions.

Prior art further more presents solutions hidden from the vehicle user that serves a crucial role for protecting the passengers of the vehicle during a collision, accident, or crash. The present invention relates to an enhancement and improvement of vehicle seats wherein the safety is enhanced for the person sitting in the vehicle seat during a crash, collision, or accident. Vehicle seats of the prior art are padded and comprises features for decreasing the risk for injuries such as whiplash protection and airbags mounted in the vehicle seat. However, most features except for the padding of vehicle seats are adapted to assist during front collisions, or forces excreted in the longitudinal direction of the vehicle. There are safety issues for crashes wherein a vertical force on a driver or passenger's spine that are not sufficiently addressed by the prior art.

Therefore, it would be beneficial to create a vehicle seat that provides additional safety features and further decreases the risk of injury to drivers and passengers of vehicles.

SUMMARY OF INVENTION

Prior art solution further comprises solutions for deforming the structure supporting the passenger or drivers weight in order to decrease the forces exerted mainly on the passenger's spine during a collision. The solutions as presented in prior art comprises deformation through compressing sheet metal, much like the deformation to the front of a vehicle during a front collision, in order to absorb the force. This has the effect that the force is absorbed in an uneven and not linear procedure making the energy absorption less effective.

The uneven energy absorption furthermore generates spikes of G-force that affects the vehicle user and thereby creating a situation where the vehicle user is subjected to unhealthy high levels of G-forces.

An object of the present invention is to decrease the risk of spinal injuries during lane departure and similar accidents wherein the vehicle ends up at a level lower than the street level, for example in a ditch.

Another object of the present invention is to decrease the G-forces exerted on the human body during vehicle accidents.

Yet another object of the present invention is to create a constant force absorption decreasing the fluctuation in the absorption capability of the structure.

Yet another object is to absorb forces exerted in a Z-direction during a collision, lane departure accident, or similar.

Thus, the solution relates to a vehicle seat arrangement in a vehicle. The vehicle seat arrangement comprises a vehicle seat with a back portion and a seat portion, said seat portion comprises a front section, adapted to support legs and knees of a user, and a rear section adapted to support the user's weight. The rear section of the vehicle seat comprises a deformation unit adapted to reduce the force exerted on the user during a crash, the force being absorbed through plastic deformation of a deformation portion. The deformation portion is adapted to deform with a linear deformation property after a force threshold is exceeded.

It is one advantage with the present solution that the deformation portion of the deformation unit deforms with a linear deformation property. This means that the deformation absorbs the same amount of energy during the deformation making the fluctuations as low as possible. This has the advantage that more energy is absorbed, less G-forces are subjected to the spine of the vehicle user, and the system works equally well independent of the weight of the user. This means that the force exerted on the spine during a lane departure and other situations when the vehicle ends up in a ditch or similar at a lower level than the street is significantly reduced.

It is further one advantage with the present solution that the deformation unit is arranged in the rear section of the vehicle seat. The reason for this is that the user sitting in the seat has a weight center in the rear section of the vehicle seat.

The force that the solution aims to minimize is a force in a negative direction, i.e. in a direction downwards relation to the travel direction of a vehicle. Forces in the Z-direction can put large stress on the spine of vehicle users.

According to an embodiment of the vehicle seat arrangement the deformation unit further comprises an attachment portion that during deformation moves in a direction that deforms the deformation portion.

It is one advantage with the present solution that the deformation unit is arranged to absorb forces in the Z-direction and that the force is absorbed mainly through increasing the length of the deformation unit in an X-direction.

According to an embodiment of the vehicle seat arrangement said vehicle seat further comprises a support carpet.

The support carpet is the part of a vehicle seat that supports the weight of the user in the seat portion. The support carpet can in different embodiments have different designs, such as a carpet, a thread structure, and a spring structure.

According to an embodiment of the vehicle seat arrangement the deformation unit and deformation portion thereof is rigid during normal driving conditions and only deforms in the event of a crash when a predetermined force threshold is exceeded.

According to an embodiment of the vehicle seat arrangement the attachment portion is adapted to progressively tear the deformation portion after the force threshold has been exceeded.

The problem with many of the prior art solutions is that they utilize technology that wrinkles or in other way deforms sheet metal unevenly meaning that the force absorption also becomes uneven. By progressively tear the deformation portion the force absorption is constant and the performance of the solution improved.

According to an embodiment of the vehicle seat arrangement the attachment portion is arranged as a part of the support carpet.

It is one advantage with the present solution that the length of the support carpet can be increased by moving the attachment portions and thereby extending the length of the deformation unit.

According to an embodiment of the vehicle seat arrangement the support carpet is a support carpet with a thread structure.

In another embodiment is the support carpet of a fiber, spring, or fabric structure.

According to an embodiment of the vehicle seat arrangement the attachment portion is a socket adapted to be dragged through a pipe structure with resistance when the force threshold is exceeded.

The solution in accordance with the appended claims can be produced in accordance with many different embodiments. According to one embodiment is a socket adapted to be dragged through a pipe structure. This solves the same technical problem in the same way as the other embodiments herein.

According to an embodiment of the vehicle seat arrangement the pipe structure has an elongated weakening allowing the pipe structure to deform when the socket is dragged through the pipe structure.

According to an embodiment of the vehicle seat arrangement the attachment portion is arranged in an aperture in the deformation portion which is smaller than the attachment portion, the attachment portion is adapted to deform the deformation portion by folding its edges making the aperture an elongated aperture of a substantially equal width, the width being substantially the same as the width of the attachment portion.

According to an embodiment is the aperture in the substantial form of a key hole.

According to an embodiment of the vehicle seat arrangement the deformation unit is a bracket comprising a deformation portion arranged to limit the length of the support carpet.

One embodiment in accordance with the appended claims is a solution wherein a bracket is arranged in order to limit the length of the support carpet. The bracket is a deformation unit and adapted to restore the support carpet to its full length if the force exceeds the predetermined threshold value. In one embodiment is the deformation unit made of a polymer material.

According to an embodiment of the vehicle seat arrangement the upholstery of the vehicle seat is released when the force threshold is exceeded.

In addition to increasing the length of the support carpet it is in one embodiment important to enable that the upholstery of the vehicle seat can be released in order to not limit the expanding length of the support carpet and deformation unit.

The deformation unit is arranged as part of the support carpet and enables that the support carpets arranged length is increased. The person skilled in the art understands that in some embodiments is the length increased through deformation, in others is the length already present but retained until the force threshold is breached.

According to an aspect for a vehicle seat arrangement arranged in a vehicle, the vehicle seat arrangement comprises a vehicle seat with a back portion and a seat portion, said seat portion comprises a front section, adapted to support legs and knees of a user, and a rear section adapted to support the user's weight. The rear section of the vehicle seat comprises a deformation unit adapted to reduce the force exerted on the user during a crash, the force being absorbed through plastic deformation of a deformation portion, and
  when a certain force threshold is exceeded,
  deforming the deformation portion with a linear deformation property.

According to an embodiment the deformation unit further comprises an attachment portion that during deformation is moving in a direction that deforms the deformation portion.

BRIEF DESCRIPTION OF DRAWINGS

The invention is now described, by way of example, with reference to the accompanying drawings, in which.

DESCRIPTION OF EMBODIMENTS

In the following, a detailed description of different embodiments of the vehicle seat arrangement is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the disclosed arrangement.

Briefly, the invention relates to a method and vehicle seat arrangement for decreasing the force exerted on a vehicle user during a collision, crash, or accident. The terms collision, crash, and accident are herein used as interchangeable terms for a situation different from a normal driving state of the vehicle and wherein there is a risk for injury of the users. The solution comprises a deformation unit with a deformation portion that is adapted to deform evenly with a linear force absorption in order to decrease the G-force that the user is subjected to.

Figure 1:
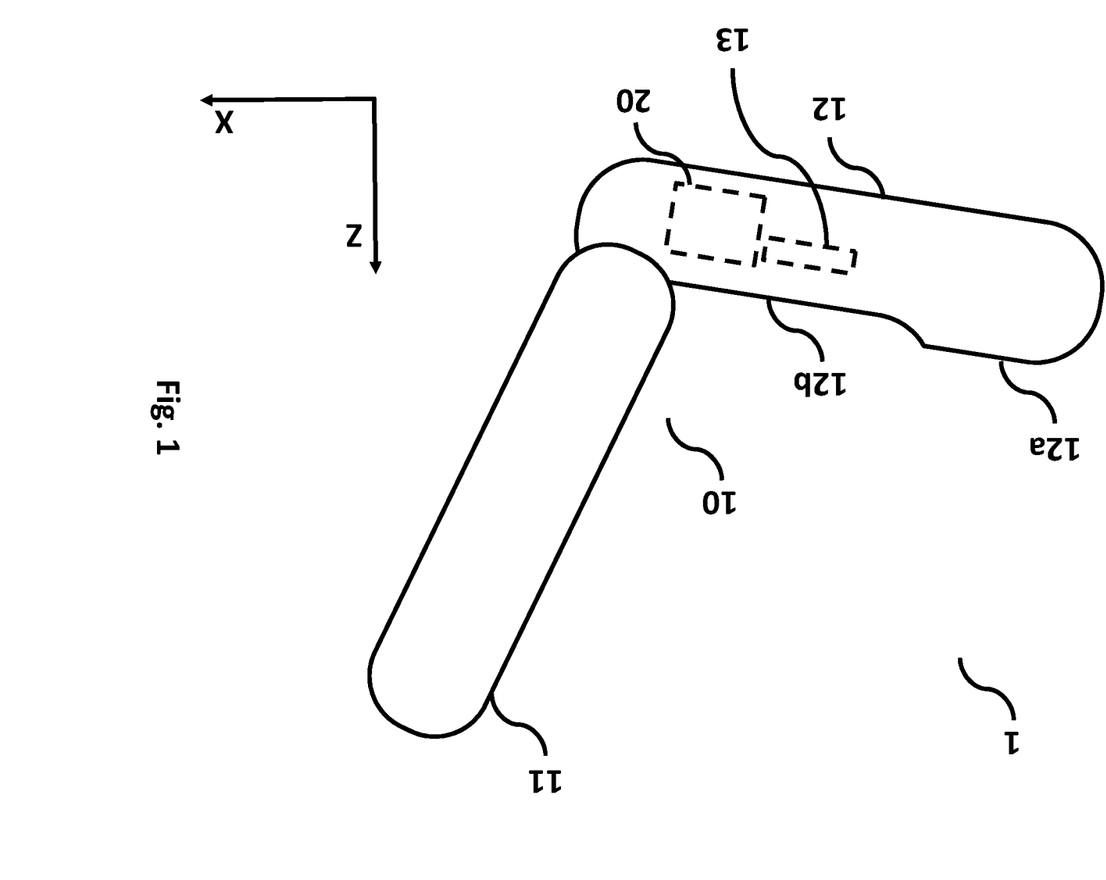
FIG. 1 illustrates one embodiment of the vehicle seat arrangement comprising a vehicle seat, back portion, and a deformation unit.

FIG. 1 illustrates one embodiment of a vehicle seat 10 in a vehicle seat arrangement 1 which is adapted to be arranged in a vehicle. The vehicle can be any form of vehicle, such as a motor vehicle, car, truck, or any other form of vehicle. The vehicle seat 10 comprises a back portion 11 and a seat portion 12, the seat portion comprises a front section 12a and a rear section 12b. Within the vehicle seat is a support carpet arranged to support the weight of the person sitting in the vehicle seat. The support carpet can be made from different materials but is in one embodiment, as used herein as an example, constituted of at least one spring 13. The support carpet has a constant length but can be adapted to spring/absorb movements to provide a comfortable ride. The support carpet has a deformation unit 20 arranged that allows the support carpet to become longer and thereby absorb forces during an accident, crash, or collision. This will be further described below.

Figure 2A:
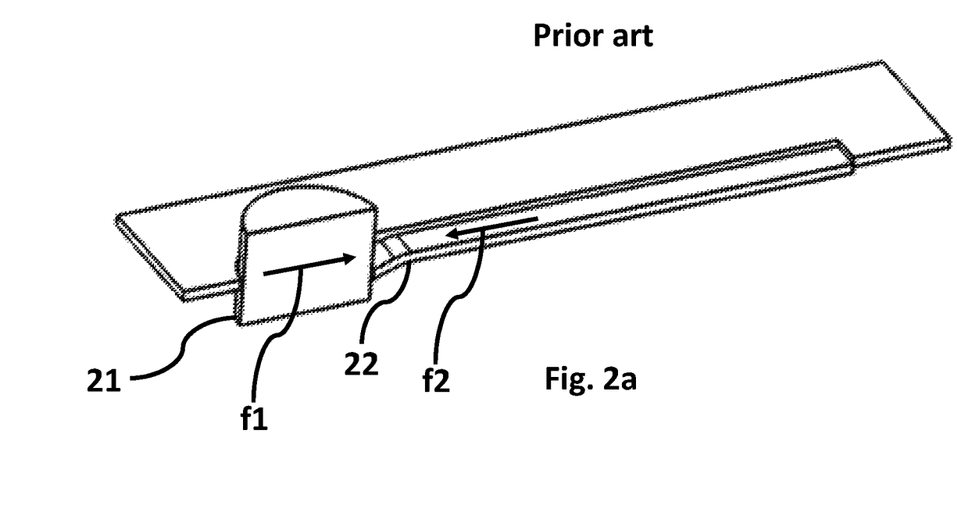
FIG. 2a illustrates a prior art solution.
Figure 2B:
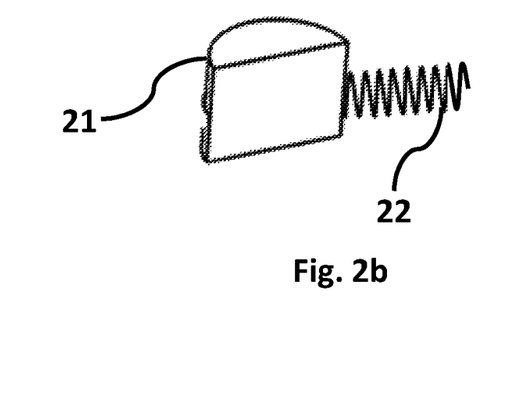
FIG. 2b illustrates a prior art solution wherein an uneven deformation has occurred.

FIGS. 2a and 2b illustrates solutions of the prior art wherein uneven deformation is utilized to absorb forces during an accident. The attachment portion 21 is attached to the support carpet and during an accident a first force f1 tries to push the attachment portion 21 and deforming the deformation portion 22. At the same time the deformation portion 22 is providing resistance, the force f2 as illustrated in FIG. 2a. When the first force f1 exceeds a threshold it is larger than the second force f2 and the deformation portion 22 is deformed to the form of a sinus wave as illustrated in FIG. 2b.

Figure 3A:
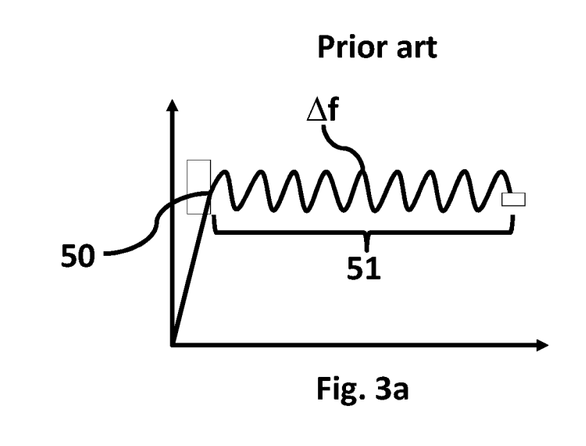
FIG. 3a illustrates a force diagram of a prior art solution.

FIG. 3a illustrates a force diagram for the deformation as illustrated between FIGS. 2a and 2b. The force during normal usage is below the force threshold 50 and do not cause any plastic deformation to the deformation unit 20. The diagram in FIGS. 3a and 3b only illustrates the situation wherein an accident has occurred and the threshold 50 is exceeded initiating the plastic deformation 51, 52. The plastic deformation 51 as illustrated in FIG. 3a illustrates the force Δf that is absorbed through the deformation of the deformation portion 22. As illustrated in FIG. 3a the wrinkling of the sheet metal as the prior art proclaims causes the force to be absorbed uneven. This creates spikes of G-forces from the high values and losses of absorption capacity during the low parts of the cycle.

Figure 3B:
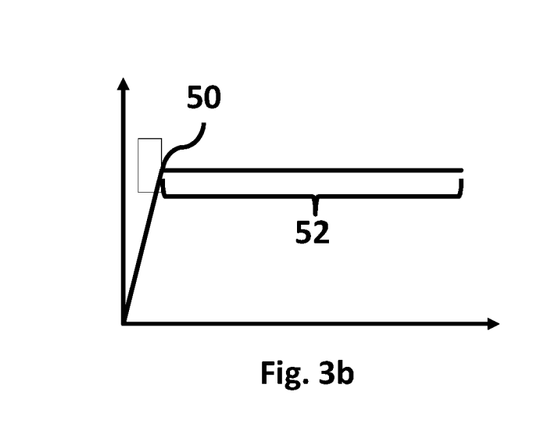
FIG. 3b illustrates a force diagram of the present solution.

FIG. 3b illustrates a force diagram of the deformation as performed by the present solution. When the force exceeds the force threshold 50 the absorption of force 52 is constant creating a system which is more effective than the prior art solutions. Furthermore, the solution is gentler towards the passengers of the vehicle.

Figure 4:
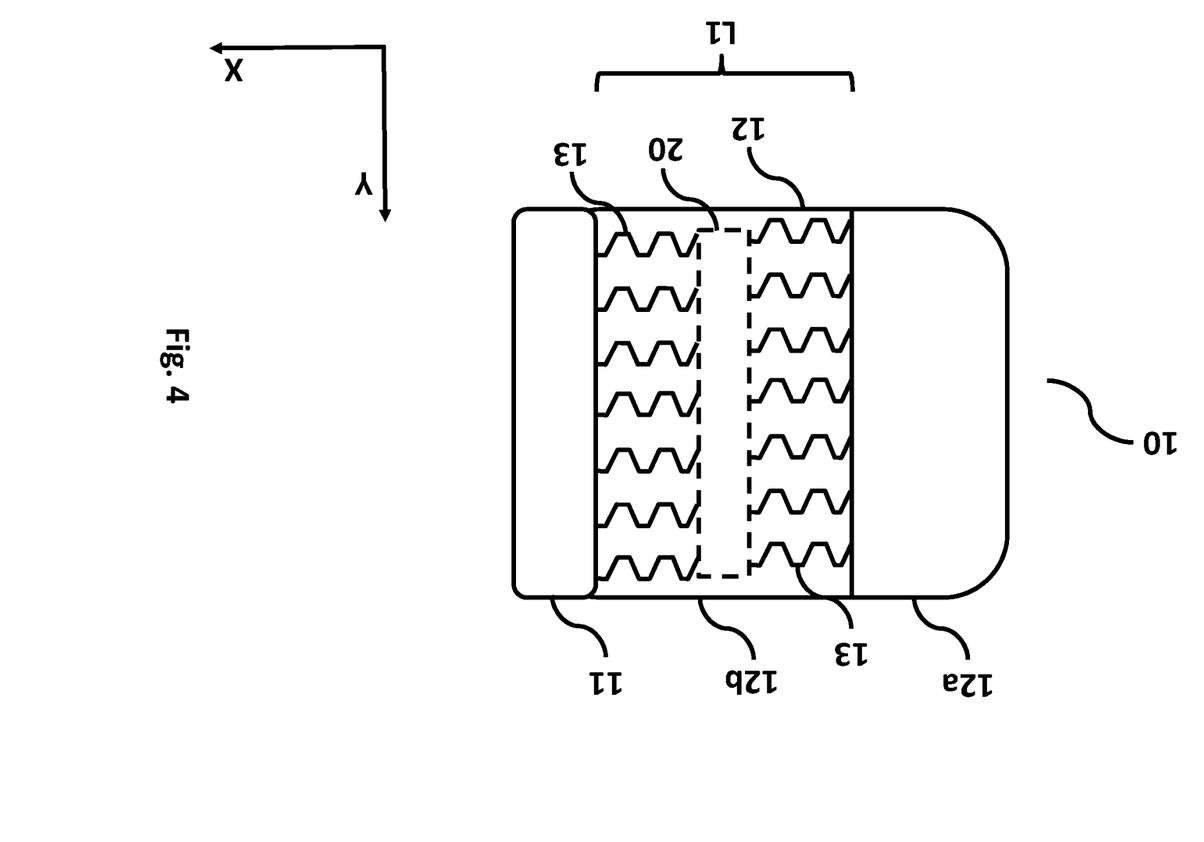
FIG. 4 illustrates a top view of one embodiment of a vehicle seat arrangement comprising a deformation unit.

FIG. 4 illustrates a top view of a vehicle seat arrangement 1, as shown in FIG. 1, wherein the vehicle seat 10 is open in a way that the interior is visible. The interior comprises a support carpet 13 and a deformation unit 20. The support carpet has a length L 1 which when the deformation portion 22 of the deformation unit 20 is deformed becomes longer and thereby absorbs the force.

Many prior art solutions arrange the deformation unit 20 at the chassis of the vehicle seat utilizing that the seat can be arranged in different positions. The problem with this is that if the vehicle seat is located in a location wherein the user has entered the setting closest to the floor the deformation portion 22 becomes very short. This has the effect that for large users some of the prior art solutions do not work. As illustrated in FIG. 4 this is addressed through in one embodiment arranging the deformation unit 20 in relation to the support carpet 13 of the vehicle seat 10. This solution instead utilizes the flex in the soft materials of the vehicle seat 10 as well as the space within the vehicle seat 10 to allow for force absorption.

Figure 5:
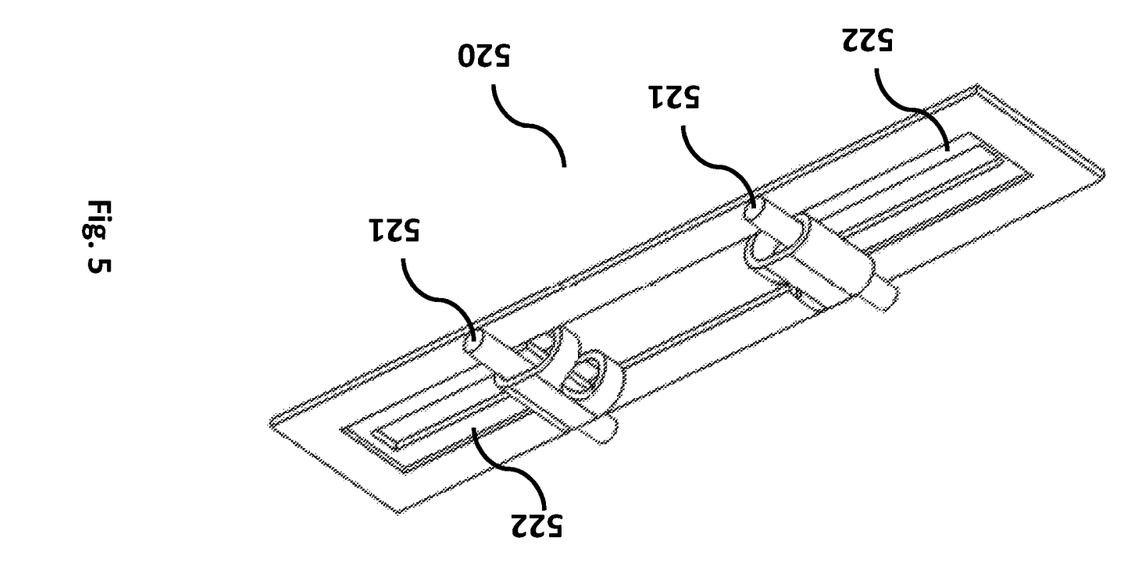
FIG. 5 illustrates an embodiment of a deformation unit.

FIG. 5 illustrates an embodiment of the deformation unit 520 comprising dual deformation portions 522 and dual attachment portions 521. The attachment portions 521 are attached to the support carpet 13 either between the support carpet 13 and an attachment means thereof or somewhere along the extension direction of the support carpet 13. The embodiment as illustrated in FIG. 5 utilizes a solution wherein deformation occurs through movement of the attachment points 521 in such a way that the deformation portions 522 are torn partly from its attachment to the deformation unit. The deformation unit 521 is in one embodiment manufactured in one piece and adapted to allow for the deformation portion 522 to be torn away from the main body of the deformation unit 521 when the predetermined threshold 50 is exceeded. Through tearing the material by creating a movement similar to the one occurring when a tin can is opened an even absorption of force is created while the length L 1 of the support carpet 13 is increased. The length is increased through increasing the length of the deformation unit 520 which is attached to the support carpet 13 extending the overall distance the support carpet 13 extends.

Figure 6A:
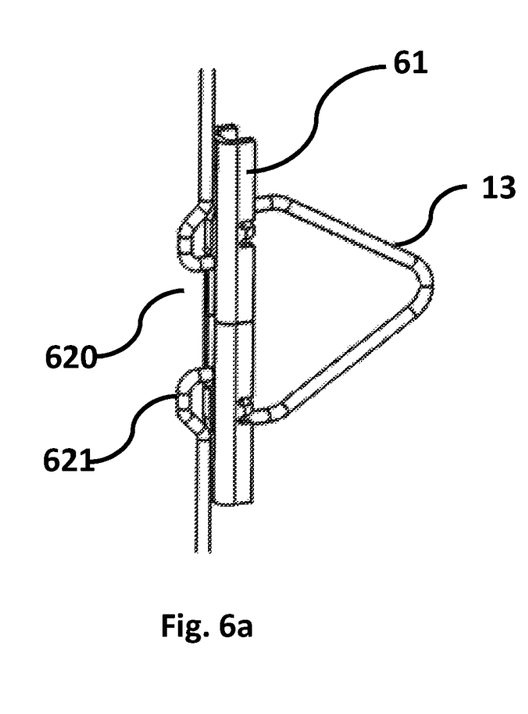
FIG. 6a illustrates an embodiment of a deformation unit.
Figure 6B:
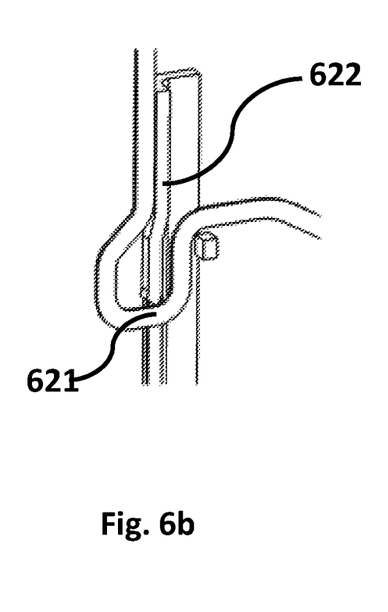
FIG. 6b illustrates part of an embodiment of the deformation unit.

FIG. 6a illustrates an embodiment of the deformation unit 620 wherein the support carpet 13 consist of a thread structure or a spring structure. The spring or thread 621 is arranged in a loop and kept in place by a bracket 61 securing the spring or thread 621 in a way that the overall length of the support carpet 13 is decreased to the length suitable for normal operation of the vehicle. The solution utilizes that the bracket 61 is adapted to give way gradually in a linear deformation pattern if forces exceeds a predetermined threshold 50. When the bracket 61 gives way the length of the support carpet 13 is increased and force is absorbed by the bracket 61. The bracket 61 is, as illustrated in FIG. 6b, adapted to give way through the attachment portion 621 deforming the deformation portion 622. The deformation portion 622 is in one embodiment made from a polymer material and adapted to be teared creating a constant force absorption.

In one embodiment are a bracket 61 arranged on each thread/spring of the support carpet 13. In another are only some of the threads comprising a bracket 61. In yet another embodiment is each bracket adapted to host multiple threads/springs.

Figures 7A, 7B:
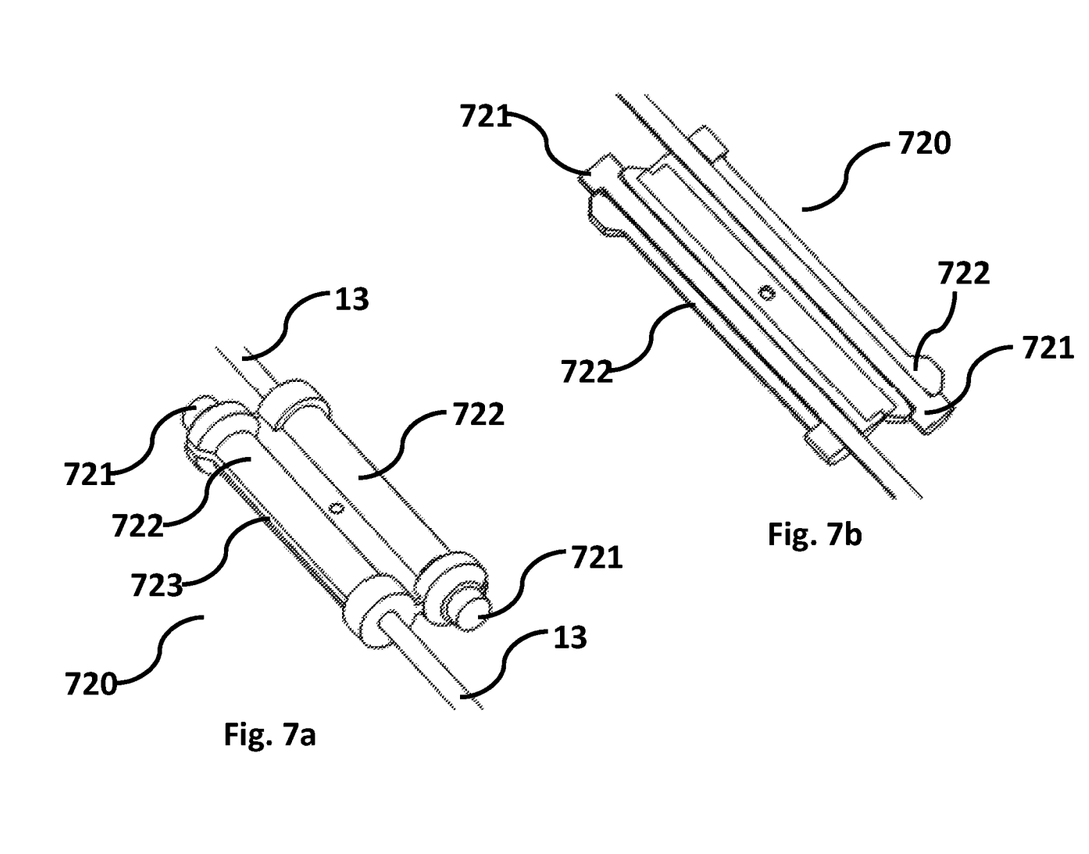
FIG. 7a illustrates an embodiment of a deformation unit.
FIG. 7b illustrates a cross section of an embodiment of the deformation unit.

FIG. 7a illustrates an embodiment of the deformation unit 20 that comprises attachment points 21 adapted to be dragged through the deformation portion 22 which in this embodiment is a pipe structure 22. The illustration in FIG. 7 illustrates merely an example of one solution wherein the attachment points 21 are dragged through the deformation portions 22. The person skilled in the art understands that any number of pipe structures 22 can be used and that the example comprising two pipe structures only is for illustrative purposes.

In one embodiment is the deformation portion 722 weakened by a longitudinal weakening 723, the weakening 723 being adapted to ensure that the absorption of force is at the right level for the application area. The weakening 723 can be any form of weakening such as a slit, aperture, any number of holes, recess, or any other form of structural weakening. In one embodiment is the socket/pipe structure 722 adapted to open up at the weakening 723 during deformation.

FIG. 7b illustrates a cross section of the deformation unit 720 as described in FIG. 7a.

Figure 8:
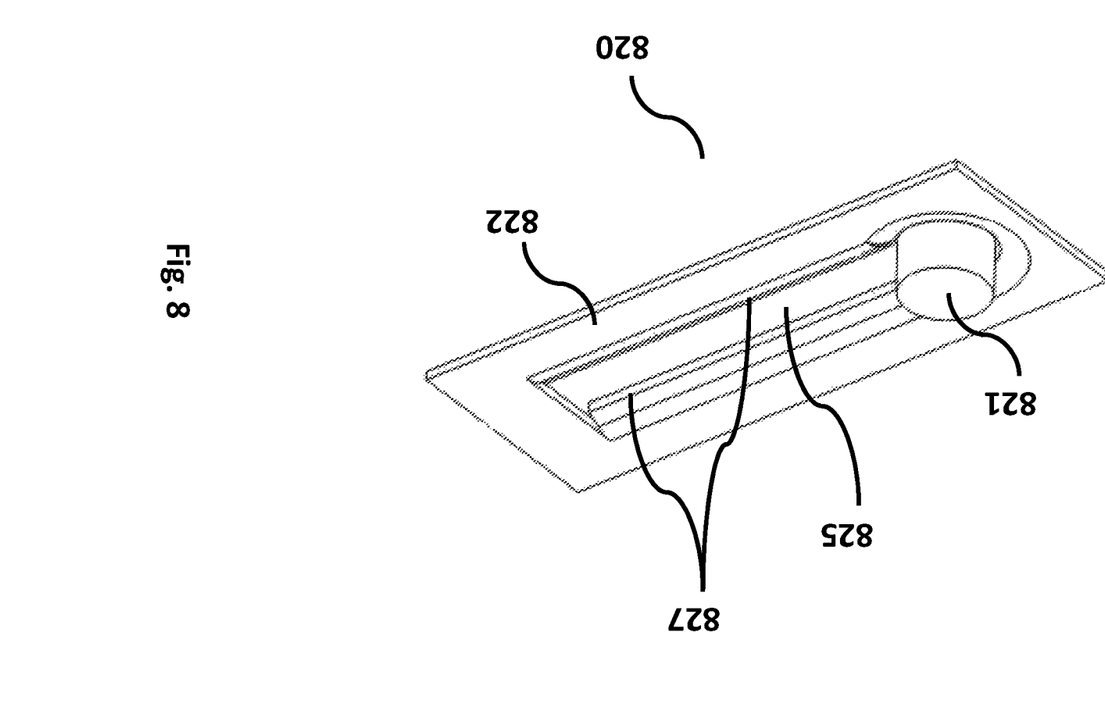
FIG. 8 illustrates another embodiment of a deformation unit.

FIG. 8 illustrates an embodiment of the deformation unit 820 wherein an aperture 825 is arranged extending part of the length of the deformation unit 820. The attachment portion 821 is arranged within the aperture 825 and is at least partly larger than the main portion of the aperture. In a normal driving state wherein the vehicle is not subjected to forces beyond a predetermined threshold 50 is the attachment portion 821 fixed in engagement at its standard position, as shown in FIG. 8. If a force exceeding the predetermined threshold 50 occurs, the attachment portion 821 is adapted to move along the recess and bend the edges 827 in order to make the aperture equally wide along its extension direction. The bending of the edges 827 provides a constant resistance that is utilized for absorbing the force.

Figure 9:
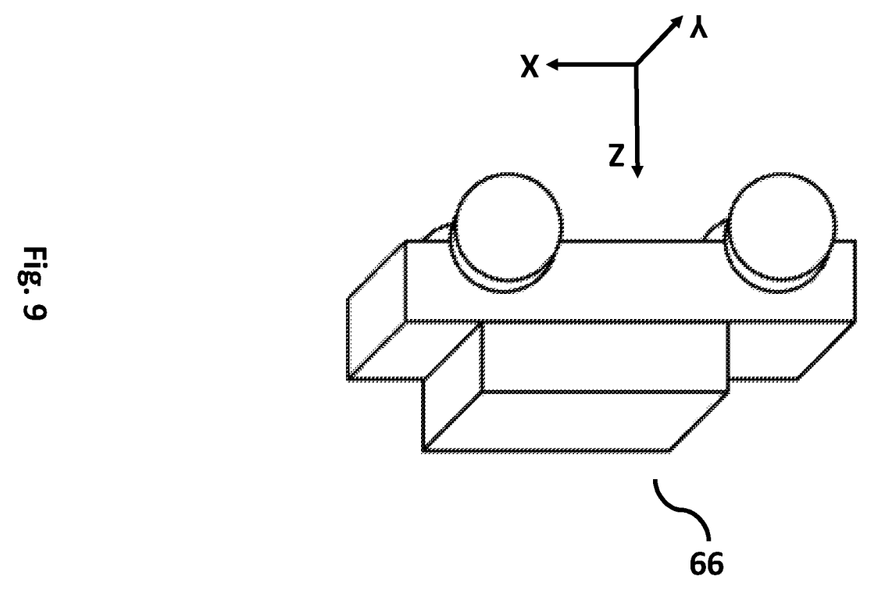
FIG. 9 for reference purposes illustrates a vehicle in a coordinate system.

FIG. 9 illustrates a vehicle 99 in a coordinate system for reference purposes. The directions x, y, z is above used for describing the direction of forces and absorption thereof.

The invention claimed is:

1. A vehicle seat arrangement in a vehicle, wherein said vehicle seat arrangement comprises:
a vehicle seat with a back portion and a seat portion, said seat portion comprises a front section, adapted to support legs and knees of a user, and a rear section including a carpet support formed of at least one of a fiber, a spring, or a fabric material, the carpet support spanningly connected to opposite sides of a chassis of the seat portion and adapted to support a weight of the user, the carpet support including a first carpet portion, a second carpet portion, and a deformation unit together defining a carpet length, wherein the deformation unit interconnects the first and second carpet portions, said deformation unit adapted to reduce a force exerted on the user during a crash, the force being absorbed through plastic deformation of a deformation portion of the deformation unit, characterized in that the deformation portion is adapted to deform with a constant deformation property of the energy absorption, after a force threshold is exceeded, wherein the deformation portion includes a pipe structure and the deformation unit includes an attachment portion comprising a socket that is adapted to be dragged through the pipe structure with resistance when the force threshold is exceeded, wherein an attachment position of the attachment portion within the deformation unit changes, and wherein the length of the carpet support is effectively increased and the force is absorbed.

2. The vehicle seat arrangement according to claim 1, wherein the deformation unit and deformation portion thereof is rigid during normal driving conditions and only deforms when the force threshold is exceeded.

3. The vehicle seat arrangement according to claim 1, wherein the attachment portion is arranged as a part of the carpet support.

4. The vehicle seat arrangement according to claim 1, wherein the pipe structure includes an elongated weakened region causing the pipe structure to deform when the socket is dragged through the pipe structure.

5. A method for a vehicle seat arrangement in a vehicle, wherein said vehicle seat arrangement comprises:
a vehicle seat with a back portion and a seat portion, said seat portion comprises a front section, adapted to support legs and knees of a user, and a rear section including a carpet support formed of at least one of a fiber, a spring, or a fabric material, the carpet support spanningly connected to opposite sides of a chassis of the seat portion and adapted to support a weight of the user, the carpet support including a first carpet portion, a second carpet portion, and a deformation unit together defining a carpet length, wherein the deformation unit interconnects the first and second carpet portions, said deformation unit adapted to reduce a force exerted on the user during a crash, the force being absorbed through plastic deformation of a deformation portion of the deformation unit, characterized in that when a certain force threshold is exceeded, said deformation portion deforms with a constant deformation property of the energy absorption, wherein the deformation portion includes a pipe structure and the deformation unit includes an attachment portion comprising a socket that is configured to be dragged through the pipe structure with resistance when the certain force threshold is exceeded, wherein an attachment position of the attachment portion within the deformation unit changes, and wherein the length of the carpet support is effectively increased and the force is absorbed.

6. The method according to claim 5, wherein the attachment portion moves in a direction that deforms the deformation portion during deformation.

7. The method according to claim 5, wherein the pipe structure includes an elongated weakened region causing the pipe structure to deform when the socket is dragged through the pipe structure.

8. A vehicle comprising a seat arrangement, wherein said vehicle seat arrangement comprises:
a vehicle seat with a back portion and a seat portion, said seat portion comprises a front section, adapted to support legs and knees of a user, and a rear section including a carpet support formed of at least one of a fiber, a spring, or a fabric material, the carpet support spanningly connected to opposite sides of a chassis of the seat portion and adapted to support a weight of the user, the carpet support including a first carpet portion, a second carpet portion, and a deformation unit together defining a carpet length, wherein the deformation unit interconnects the first and second carpet portions, said deformation unit adapted to reduce a force exerted on the user during a crash, the force being absorbed through plastic deformation of a deformation portion of the deformation unit, characterized in that the deformation portion is adapted to deform with a constant deformation property of the energy absorption, after a force threshold is exceeded, wherein the deformation portion includes a pipe structure and the deformation unit includes an attachment portion comprising a socket that is configured to be dragged through the pipe structure with resistance when the force threshold is exceeded, wherein an attachment position of the attachment portion within the deformation unit changes, and wherein the length of the carpet support is effectively increased and the force is absorbed.

9. The vehicle according to claim 8, wherein the attachment portion moves in a direction that deforms the deformation portion.

10. The vehicle according to claim 8, wherein the attachment portion is arranged as a part of the carpet support.

11. The vehicle according to claim 8, wherein the pipe structure includes an elongated weakened region causing the pipe structure to deform when the socket is dragged through the pipe structure.

* * * * *